Aug. 17, 1926.
W. BARTELS
1,596,706
CONNECTING MEANS
Filed Oct. 16, 1925
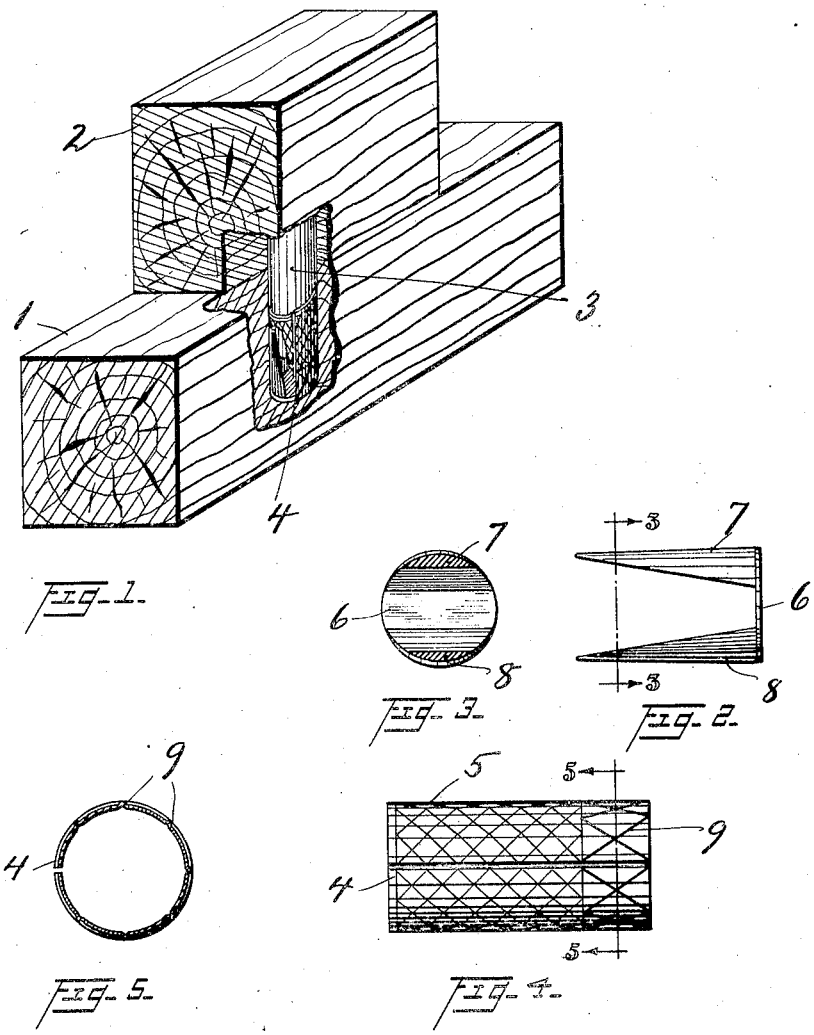
INVENTOR.
William Bartels
BY
ATTORNEY.

Patented Aug. 17, 1926.

1,596,706

UNITED STATES PATENT OFFICE.

WILLIAM BARTELS, OF NEW YORK, N. Y.

CONNECTING MEANS.

Application filed October 16, 1925. Serial No. 62,903.

My invention has reference to the art of connecting parts made of wood, or similar material by means of dowel-pins. As now practised, the parts to be connected are provided with machine-made smooth, preferably round holes adapted to receive the ends of the dowel-pins. For making such a connection durable, one applies glue to the ends of the dowel-pins and to the holes, whereupon the parts are united by means of the preferably round dowel-pins which enter round smooth holes in said parts and of a length permitting the meeting faces of said parts to bear closely against each other. Such a connection is, to a certain extent, satisfactory as it obviates the use of wire-nails, metal screws, or the like, but as soon as, due to changes in temperature or due to climatic conditions, the glue becomes soft or defective, the dowel-pins work loose, and the parts connected thereby, come apart, and they must be freshly glued together.

To overcome this drawback, is the purpose of my invention. By way of example, I have shown, on the drawing herewith, an embodiment of my invention, Fig. 1 being an elevational view of two parts of wood joined together by dowel-pins, one of which only is shown, some portions of the wooden parts being broken away to better illustrate the invention; Fig. 2 shows the wedge member, Fig. 3 is a section along 3—3 in Fig. 2 and Fig. 4 shows the split tubular member having a roughened outer surface, and Fig. 5 is a section along 5—5 in Fig. 4.

1 and 2 are two wooden parts to be united. 3 is one of the dowel-pins shown as a round pin and adapted to enter correspondingly shaped holes in said two wooden parts thus forming a connecting means for said parts. In order to make the connection more endurable and more secure, split tubular members 4, like the one shown in Fig. 4 are provided, which members are preferably made of sheet metal and are provided with a roughened outer surface 5. These split tubular members are inserted into the holes bored in the said parts for the reception of the dowel-pins, so that on the latter being driven into the holes, they will expand the said tubular members causing their roughened outer surfaces to firmly engage the inner walls of the holes referred to, at the same time also gripping the ends of the dowel-pins. To aid in the expansion of said tubular members and also in the gripping of the ends of the dowel-pins, wedge-members as shown in Fig. 2 are provided, comprising a disk-portion 6 and two wedge-shaped prongs 7 and 8. These wedge-members are inserted into the split tubular members when the latter are in place in the holes of the parts to be united and when now the dowel-pins are driven into said holes, their ends are firmly gripped by the wedge-shaped prongs 7, 8 of the wedge-members, and thus these wedge-shaped prongs cooperate at the same time with the dowel-pins to expand the split tubular members in the holes forcing their roughened outer surfaces into close contact with the inner walls of said holes. If desired, the inner walls of the holes, prior to the split tubular members being placed therein, may be roughened to thereby afford a still better engagement with the split tubular members.

The ends of the latter may be re-inforced as shown in Figs. 4 and 5, where ribs 9 are provided, pressed from the metal of said members and giving the said tubular members great rigidity.

The wedge-member in Fig. 2 is shown with two wedge-shaped prongs, but, of course, a plurality of such prongs may be provided, and otherwise, obvious modifications may be readily suggested in the embodiment of my invention as shown. Therefore, I wish it to be understood, that I do not limit myself to the exact construction as shown.

What I claim is:

1. The improved connection of parts made of wood, or similar material, comprising in combination with dowel-pins fitting holes provided in said parts, split tubular members having roughened outer surfaces and adapted to receive said dowel-pins so as to be expanded thereby into firm engagement with the inner walls of said holes, and a separate wedge-member loosely inserted in each of said tubular members and adapted to cooperate with the ends of said dowel-pins for expanding said tubular member.

2. The improved connection of parts made of wood, or similar material, comprising in combination with dowel-pins fitting holes provided in said parts, of roughened split tubular members of metal adapted to receive said dowel-pins so as to be expanded thereby into firm engagement with the inner walls of said holes, the said tubular members having ends re-inforced by ribs or the like pressed out of the metal of said tubular members, and wedge-members adapted to be loosely inserted in said tubular members and to cooperate with the ends of said dowel-pins for expanding said tubular members.

In testimony whereof I affix my signature.

WILLIAM BARTELS.